United States Patent Office 3,440,504
Patented Apr. 22, 1969

3,440,504
MONITORING CONTROL FOR A SERVOMECHA-
NISM INCLUDING A DEADBAND
Boris Boskovich, Fridley, John H. Lindahl, Wayzata, Edward W. Mehelich, Fridley, and David L. Mellen, Wayzata, Minn., assignors to Honeywell Inc., Minneapolis, Minn., a corporation of Delaware
Continuation of application Ser. No. 197,524, May 24, 1962. This application Mar. 28, 1966, Ser. No. 538,103
Int. Cl. G05b 6/02
U.S. Cl. 318—18                                                13 Claims

ABSTRACT OF THE DISCLOSURE

A motor direction rate monitor. A first signal in accordance with a motor direction rate demand is algebraically summed with a second signal in accordance with the motor actual direction rate. A monitor responds to the sum of the two signals. The monitor has a threshold of operation or a dead spot that exceeds the magnitude of either first or second signal, but is less than their sum, when they are of opposite sign or inconsistent. Consequently, when the signals are of opposite sign or the rate signals are inconsistent, they actually provide a sum overcoming the threshold. Operation of the monitor renders the motor ineffective to operate a condition control device in response to the said command signal.

---

The present invention relates generally to fail safe or monitoring apparatus used in condition control systems and in more particularity relates to fail safety apparatus adapted to prevent improper control of an aircraft, which control may be had by operating attitude changing means thereof. The attitude changing means may be operated by an automatic pilot system and improper control may result from improper following of the direction of operation of attitude changing means with respect to the commanded direction of operation.

Many automatic condition maintaining means such as automatic pilot systems for aircraft include provisions for rendering operating means such as a servomotor of such automatic pilot system effective to operate condition changing means such as attitude changing means of an aircraft. Such means for making the servo effective may be in the form of selectively operable clutches between the servomotor and the attitude changing means, in the electric type servo actuators. In hydraulic systems where the servo is of the hydraulic type having a piston or ram under control of the displacement of a control valve, an engage valve is operated to render the control valve effective to operate the power ram of such servomotor.

In the present invention novel means are provided associated with such clutches or engage valve whereby the servomotors of such automatic pilot system are made ineffective to operate the attitude changing means, such as a control surface of a moving craft such as an aircraft when the direction of servo operation called for differs from the direction of servomotor operation actually achieved.

An object therefore of the present invention is to provide a novel fail safe arrangement that disengages or renders ineffective a control apparatus, such as an automatic pilot, from condition changing means, such as attitude changing means of an aircraft, when an indication or the sign of the direction of command to the operating means for the attitude changing means differs from an indication or the sign of the actual direction of operation of the operating means.

A further object of this invention is to disengage the operating means from a control surface or render the operating means ineffective on the surface when there is a divergence between the command to the servomotor and the response of the servomotor to such command.

A further object of the invention is to render a servomotor ineffective to operate attitude changing means on an aircraft or other moving craft when the sign of the direction of command rate to the operating means for the attitude changing means differs from the sign of the actual rate of direction of operation of the operating means.

The above and other objects and advantages of the invention will appear more fully hereinafter from a consideration of the detailed description taken together with the accompanying drawing wherein several embodiments of the invention are illustrated. It is to be understood that the drawing is for the purpose of illustration of the invention described only and is not designed as a definition of the limits of the invention.

Referring to the drawing.

Figure 1:
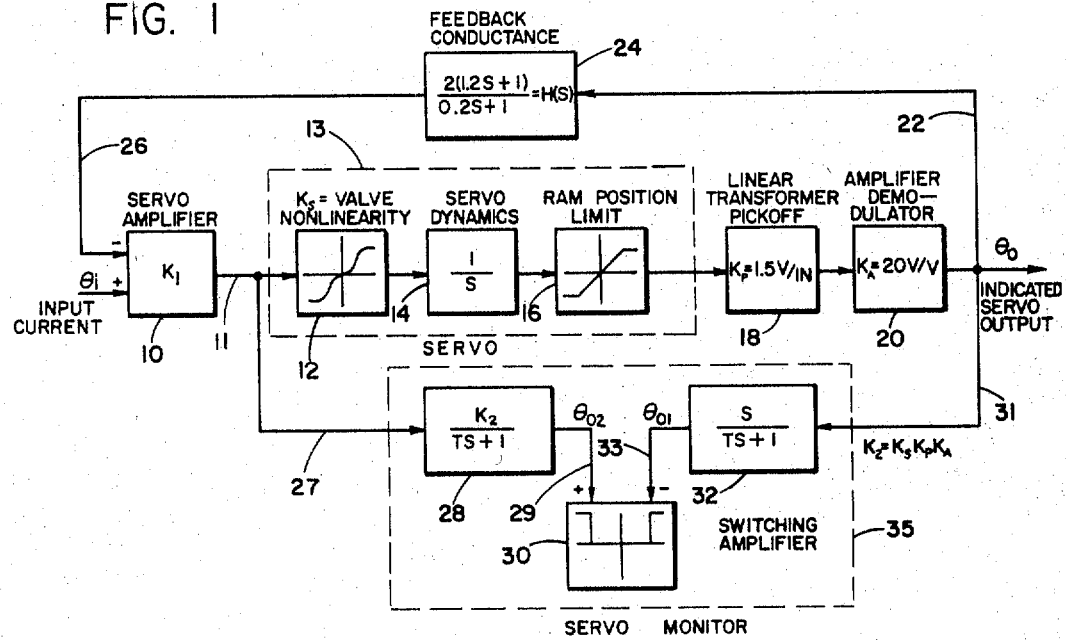
FIGURE 1 is a block diagram of a servo rate error servo monitor.

Arrangements that monitor the performance of condition control apparatus, such as automatic pilots for aircraft, and which on malfunction of the automatic pilot render the servomotor thereof ineffective to position the control surface of an aircraft are often referred to as "fail safe" devices since by rendering the servomotor ineffective to operate the surface, such surface may be manually operated to maintain control of an aircraft. Devices of this type of monitoring apparatus which render the servomotor ineffective to operate a control surface are well-known in the art and United States Patent 2,673,314 of Mar. 23, 1954, is illustrative thereof.

A feature which is believed to distinguish the subject invention from the prior art is that the monitor herein disengages or renders ineffective condition control device, such as an autopilot from the condition changing means, such as attitude changing means of an aircraft, when a signal representing the direction of operation commanded to the operating means for the attitude changing means differs from a signal representing and expected from the actual direction of operation of the operating means.

Preferably, in one embodiment of the concept, the servomotor is not disengaged or rendered ineffective to operate a control surface of an aircraft until the actual servo rate differs in sign rather than merely in magnitude from the commanded servo rate. Consequently, the monitor or fail safe device allows the servomotor response operation rate in this case to deteriorate without disengaging or rendering the servomotor ineffective so long as the servo operation direction tends to follow the commands. The advantage of this is that in certain areas of the flight profile of some aircraft, a rendering of the servomotor ineffective or disengaging the servo from its control surface upon deterioration in servomotor rate would be less desirable than tolerating a deterioration in servo performance or servo response, especially if such disengagement were made without the pilot being made aware thereof. The rate direction monitor affords an increased mission reliability for the aircraft over merely position sensitive monitors.

As stated fail safe provisions may be utilized in an automatic pilot to render the servomotor ineffective on the control surface in the manner illustrated by the above United States Patent 2,673,314 to MacCallum, but alternatively the fail safe arrangement may be used to disengage the servomotor from the control surface by isolating the servomotor from such surface and by disengaging a clutch. Further Patent 2,960,284 to C. M. Perkins is illustrative of an automatic pilot utilizing a hydraulic type servomotor which may be rendered either effective or ineffective to operate a control surface in response to movement from a control valve by a control circuit through a pilot valve or engage valve operating solenoid such circuit in turn being maintained through a disconnect switch and which switch or one similar to it may be operated by a monitoring arrangement as herein.

Referring to FIGURE 1 which shows the invention embodied in the servo rate error servo monitor applied to an operable device such as a hydraulic type servomotor, a servo amplifier 10 which receives input control signals such as from attitude sensors of an aircraft has its output supplied to transmission means 11 to operate a servo ram displacement control valve 12 having the displacement-flow characteristics illustrated. The operation of the valve 12 ports fluid to either side of the ram or power piston of the servomotor so that its displacement is an integration of the time displacement of the control valve, thus the ram displacement is represented by the symbol $1/S$. The servo ram has a position limit as represented within block 16 and shows the position varying with time that the valve is open. The servo ram displacement in turn operates a linear transformer or potentiometer type AC pickoff to develop a signal in accordance with the extent of the displacement of the servomotor ram from a normal position. The signal from the transformer pickoff or potentiometer 18 is converted to DC signal by an amplifier demodulator 20, and the DC signal from the demodulator is transmitted by conductor 22 and a proportional plus integral feedback conductance network 24 and conductor 26 to the input side of servo amplifier 10 where it is combined with the input signals. The above arrangement is typical of proportional plus integral hydraulic servo type automatic pilots.

The arrangement additionally includes the servo rate error servo monitor whereby the output from the amplifier 10 is supplied through conductor 27 to a lag network 28 having its output in turn supplied through conductor 29 to a switching amplifier 30. Additionally the output from the amplifier demodulator 20 is supplied through conductor 31 and highpass network 32 thence through conductor 33 to the switching amplifier 30. The networks 24, 28 and 32 are of conventional type and may be of the resistor capacitor type since DC signals are utilized therefor.

This monitor of FIGURE 1 detects a difference by switching amplifier 30 between commanded servo rate (servo valve displacement) and actual servo ram rate (highpass servo ram displacement output) and disengages the servomotor or renders the same ineffective on the control surface whenever this difference is greater than a predetermined or significant magnitude as determined by the switching amplifier dead spot illustrated within amplifier 30. The relationship of the gain $K_2$ of lag network 28 with respect to the gains $K_A$, $K_P$, $K_S$ for the amplifier demodulator, pickoff 18, and valve nonlinearity 12 is as stated in the figure. The letters S and T as conventional represent the LaPlace operator and time constant.

Figure 2:
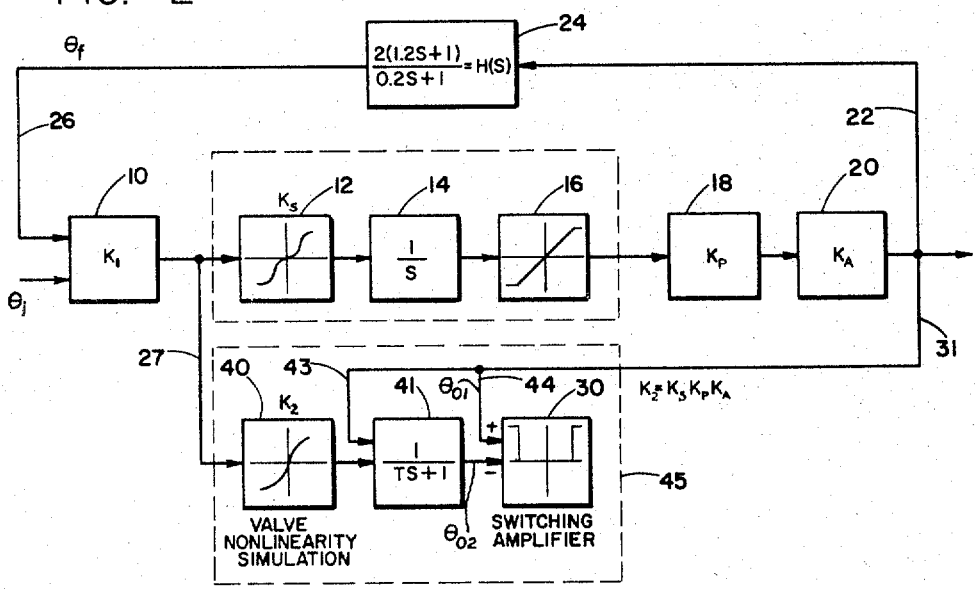
FIGURE 2 is a block diagram of a position error servo monitor.

In FIGURE 2 the features therein corresponding to that of FIGURE 1 have the corresponding reference characters. With respect to the position error servo monitor however, the output from the servo amplifier 10 is supplied via conductor 27 through a valve nonlinearity simulation network 40 and from there through a lag network 41 to switching amplifier 30 corresponding to such amplifier in FIGURE 1. The output of the amplifier demodulator 20 is supplied by conductor 31 in one instance and conductor 43 to lag network 41 and thence to the switching amplifier 30 and secondly to subconductor 44 directly to the switching amplifier 30. It is to be noted that the electrical signal on conductor 44 is opposed to the output signal from lag network 41 on switching amplifier 30 as represented by the mathematical symbols. Additionally the gains are $K_2$ for the nonlinearity simulation network 40, $K_S$ for the valve nonlinearity 12, $K_P$ for the linear transformer pickoff 18, and $K_A$ the amplifier demodulator 20 as noted. Thus this configuration in FIGURE 2 includes compensation for both servo valve nonlinearity and servo ram position limiting.

Manipulation of the transfer functions of the various components in FIGURE 2 yields:

$$\theta_{01}(s) - \theta_{02}(s) = TF(s) \left( \frac{S + K_1 K_2 H(s)}{TS+1} \right)$$

where $F(s)$ is the servo output due to failure. Proper filtering of this signal yields an output which is proportional to servo position error. When the position error signal is greater than the preset value (switching amplifier dead spot), the servo is disengaged.

Figure 3:
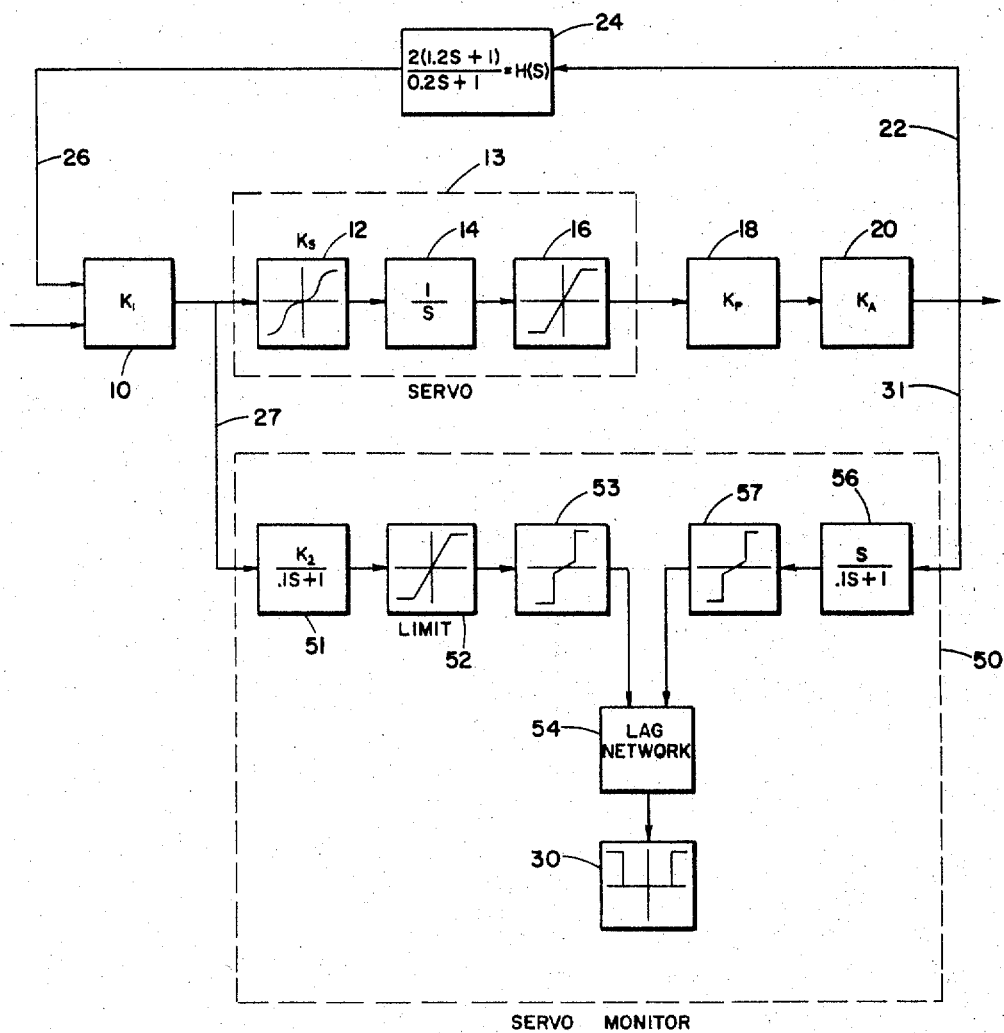
FIGURE 3 is a block diagram of a rate direction servomotor monitor.

In FIGURE 3 a variation of a servomotor monitor from that shown in FIGURE 2 is designated as the rate direction servo monitor 50. In this arrangement the amplifier output on conductor 27 is supplied through a lag network 51, limiter 52, a first trinary 53, lag network 54 to switching amplifier 30. Also the output from amplifier demodulator 20 is supplied over conductor 31 to a highpass network 56, thence through a second trinary 57, lag network 54 to the switching amplifier 30.

Concerning the inputs to lag network 54, as they affect switching amplifier 30 if the rate of operation of the servo 14 as reflected by operation of pickoff 18 is the same as that direction rate commanded from the output of amplifier 10 the inputs to lag network 54 are subtracted and no operation of switching amplifier 30 results. However, if the direction rate of servo movement is the opposite to that commanded, the inputs to lag network 54 are combined rather than subtracted thus applying a control signal of sufficient magnitude to overcome the dead spot on switching amplifier 30 to result in rendering the servomotor ineffective to operate the control surface. Thus in the servo monitor of FIGURE 3, the servomotor 14 is not disengaged from its control surface or rendered ineffective to position such surface merely because the servo rate deteriorates but actually not until the actual servomotor rate signal differs in sign from the commanded servo rate signal. In other words, if the servomotor 14 moves in the direction commanded, the monitor allows the servo response to deteriorate, in other words the actual servo rate may be less than that commanded by amplifier 10, without disengaging so long as the servo direction of operation tends to follow commands. This as stated is desirable since in various aircraft having a wide flight profile, a servomotor disengagement or rendering the same ineffective on a control surface could be considerably more disastrous than experiencing a deterioration in servo response rate. The rate direction monitor therefore affords an increased mission reliability over the previously discussed monitors of FIGURES 1 and 2.

If the direction rate of servo 14 is opposite from that commanded by amplifier 10, switching device 30 will be operated to render servo 14 ineffective on the control surface.

As we shall see with respect to the electrical embodiment of FIGURE 3 provided in FIGURES 4A and 4B, this configuration makes use of two trinary networks 53, 57. The input to one trinary 53 is the commanded servo rate (servo valve input). The other trinary 57 is fed by the servo output rate by means of highpassed servo ram position or displacement from normal. Polarities are such that the outputs of the trinary networks 53, 57 have the same sign when the servo output rate and the commanded servo rate are consistent and thus have the same sign. Subtracting the trinary outputs is effected within switching amplifier 30 which has a dead spot of slightly less than twice the output of a single trinary. The amplifier 30 is switched (and the servo disengaged or rendered ineffective) when the signs of the rate signals from networks 53, 57 are of opposite character, the algebraic sum is greater than when the signs are of like character. The term trinary indicates devices 53, 57 having three stable states, and they are used since they respond to significant electrical signals but not to quiescent electrical signals or currents because of the inherent dead spots.

Because of slight differences in the transient time of response of the commanded servo rate channel relative to that of the output or servo rate channel, a small lag network 54 follows the networks 53, 57. This lag network prevents the switching amplifier input from the faster channel from changing to its other stable state before the switching amplifier input from the slower channel can switch (when the servo rate changes sign).

Further concerning FIGURE 3, while the block diagram shows but one servo amplifier 10 controlling valve 12 of the servomotor 13, in the actual embodiment I prefer to provide a second amplifier for redundancy purposes and operating in parallel with the servo amplifier 10 to energize the torque motor for positioning a hydraulic servomotor control valve thus outputs from two similarly controlled amplifiers are combined to operate servo valve 12, FIGURE 3. Such torquing arrangement utilizing a single amplifier rather than two amplifiers for differentially positioning a control valve is old in the Perkins Patent 2,960,284, see FIGURE 4 thereof. In the arrangement of the patent, there are two windings alternatively energized depending upon the phase or polarity of the input control signal to the servo amplifier 341.

Figure 4:
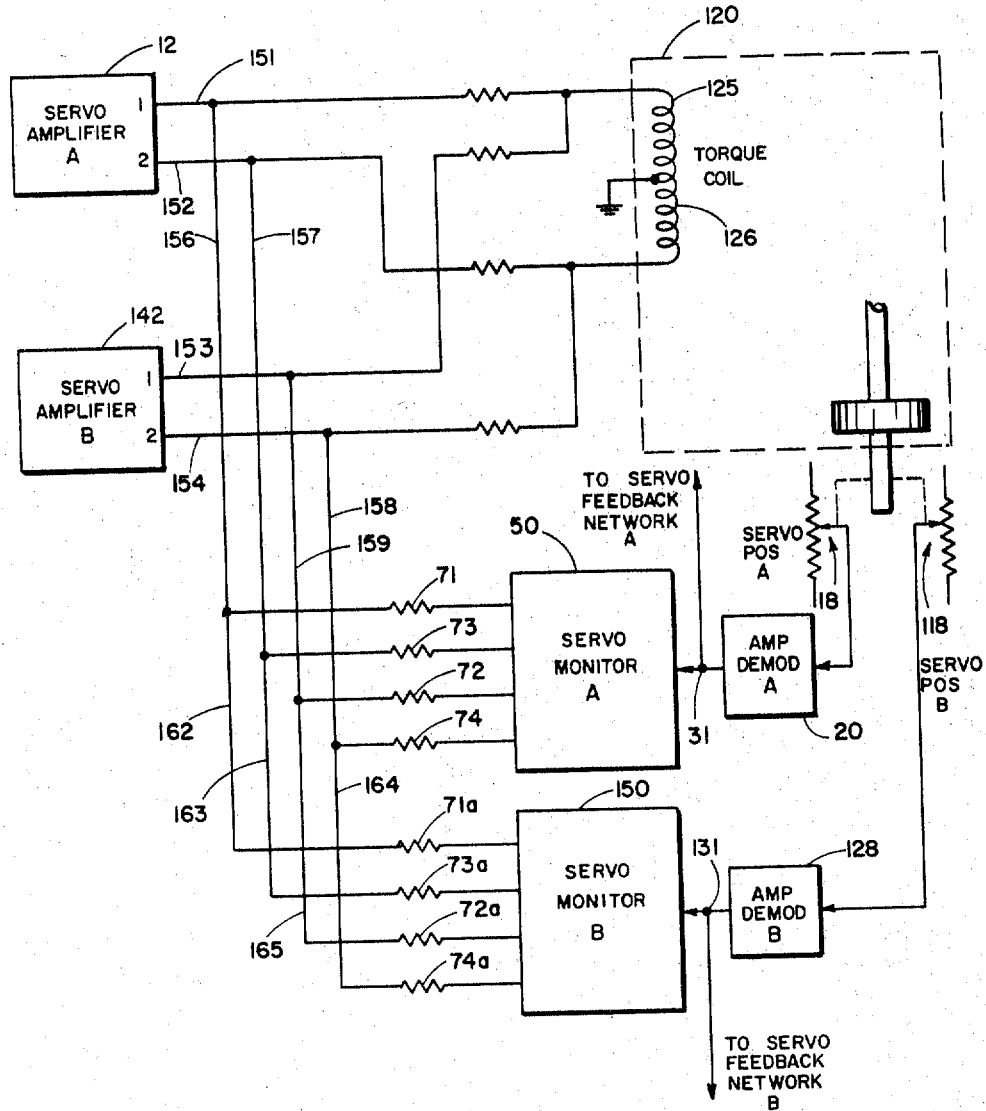
FIGURE 4 is a block diagram of a dual redundant servo monitor circuit.

FIGURE 4 shows the dual monitor circuit applied for example to the control of the hydraulic type servomotor 120 that may operate, for example, a rudder control surface of an aircraft. The dual monitor circuit comprises a first servo amplifier 12, the single hydraulic type servomotor 120, a servo position feedback signal generator 18, a second servo displacement feedback signal generator 118, a first amplifier demodulator 20, a second amplifier demodulator 128, a first servo monitor 50, a second servo monitor 150, and a second servo amplifier 142. As shown each servo amplifier 12, 142 has dual outputs or alternate outputs supplied from its output section which determines commanded servo rate. The output of one phase from servo amplifier 12 is supplied through conductor 151 to energize winding 125 to operate the flapper valve 127 shown in detail in FIGURE 5. The output of opposite phase from amplifier 12 is supplied over conductor 152 to torque winding 126 to operate the flapper 127 in the opposite direction. Similarly the output from servo amplifier 142 of one phase is supplied by conductor 153 to torque winding 125 and the output of opposite phase from amplifier 142 is supplied through conductor 154 to torque winding 126.

Figure 6A:
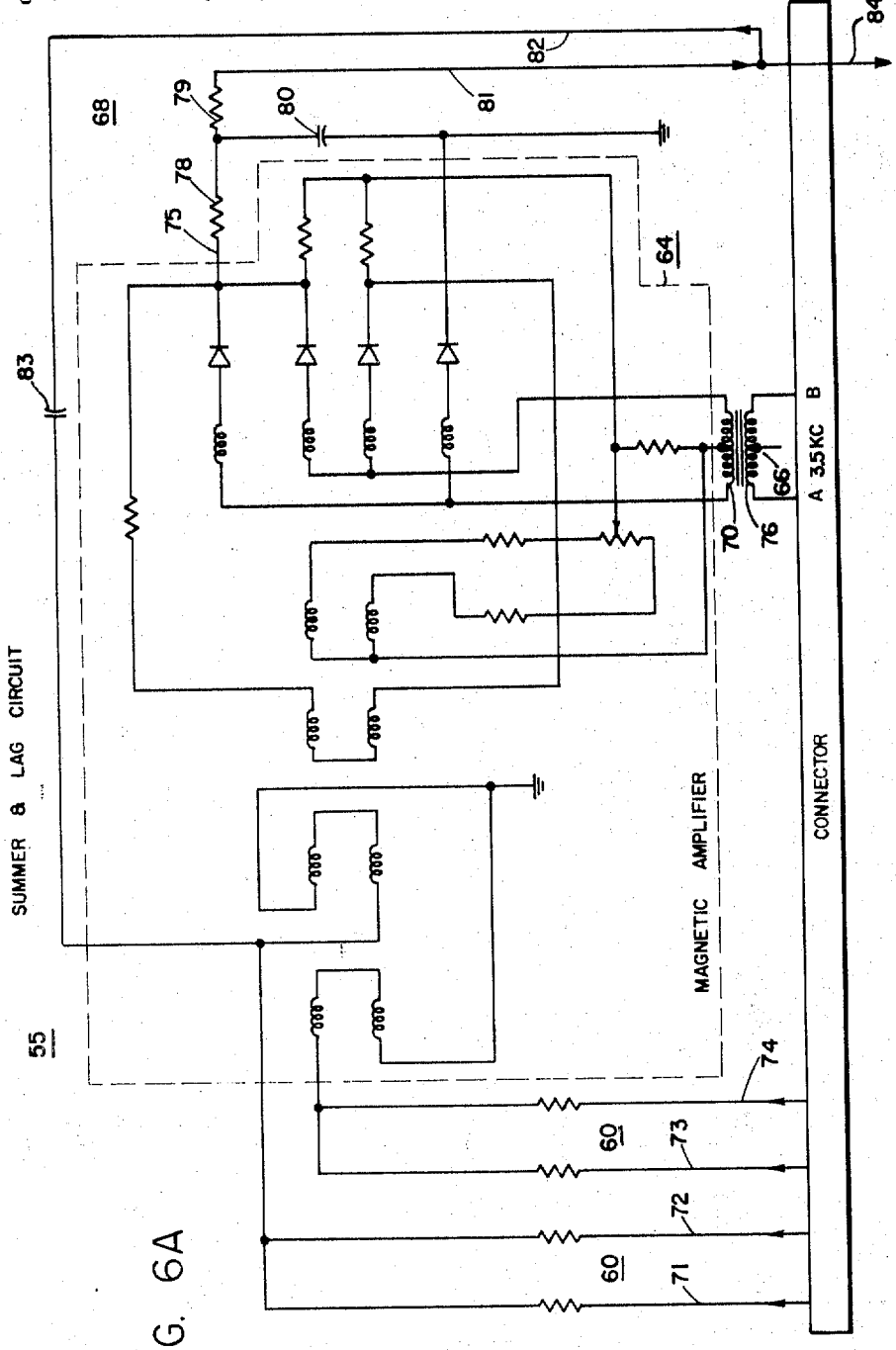
FIGURES 6A and 6B, jointly comprise an electrical schematic of the rate direction servo monitor of FIGURE 3.
Figure 6B:
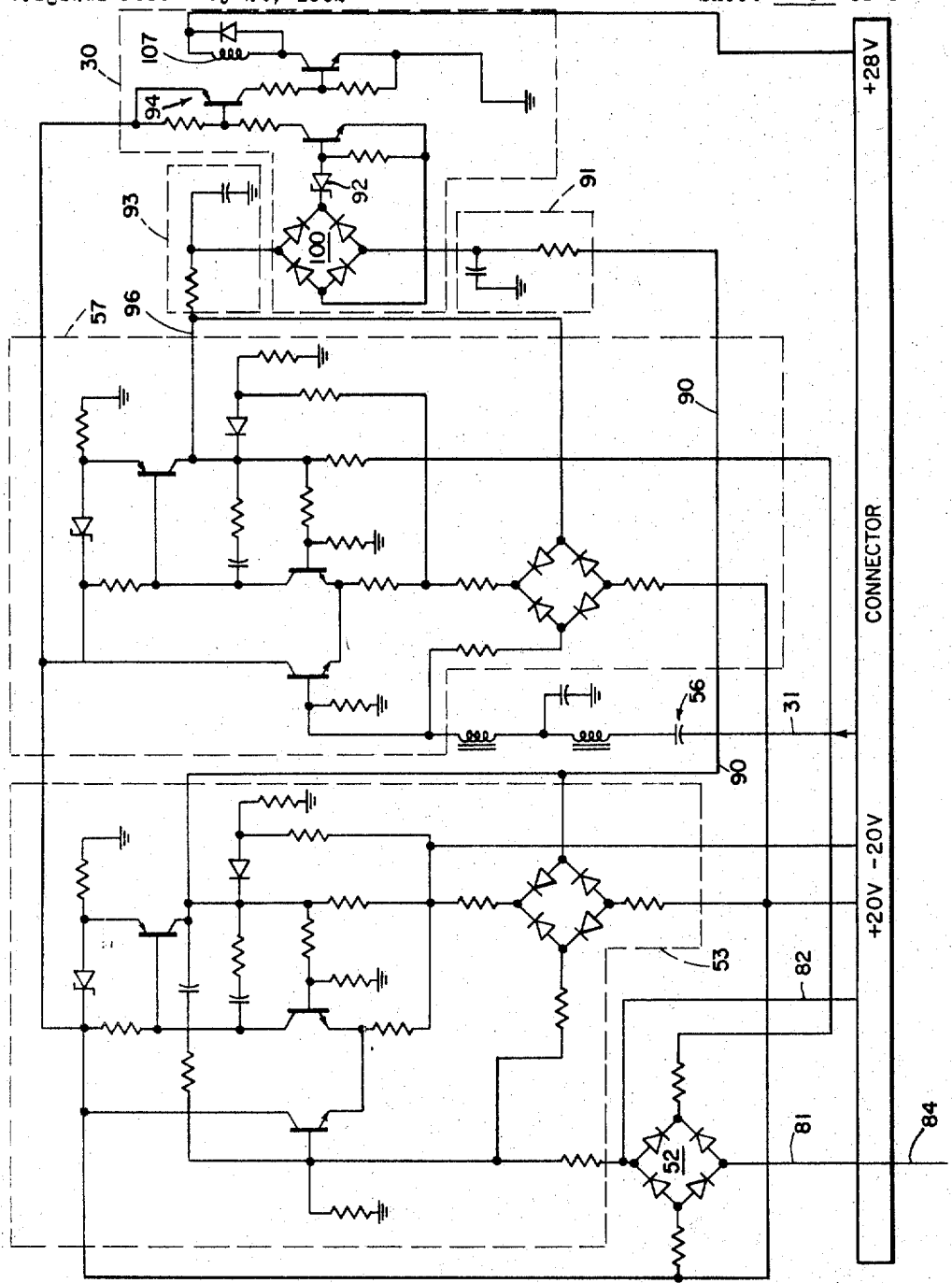

Additionally the output from conductor 151 is supplied through a subconductor 156 and through conductor resistor 71 to servo monitor 50. By the above arrangement, the servo monitor 50 is operated in parallel electrically with respect to torque windings 125, 126. Similarly the output on conductor 153 is supplied over a subconductor 159 through resistor 72 to servo monitor 50 and the other output of amplifier 142 appearing on conductor 154 is applied through subconductor 158 through resistor 74 to the servo monitor 50. Also the servo displacement signal on feedback potentiometer 18 is supplied through the amplifier demodulator 20 and conductor 31 to the servo monitor 50. The details of servo monitor 50 is as shown in FIGURES 6A and 6B, the resistors 71, 72, 73, 74 are shown externally in FIGURE 6 for ease of comparison of the figures.

A second servo monitor 150 is operated in parallel with servo monitor 50 and thus receives an input from energized conductor 156 through subconductor 162 and conductor resistor 71a, and further receives a second input from energized conductor 157, subconductor 163 and conductor resistor 73a. A third input is provided from energized conductor 159, subconductor 165, conductor resistor 72a, and the fourth input is supplied from energized conductor 158, subconductor 164, resistor 74a. The servo monitor 150 also receives in addition to the commanded rate inputs through resistors 71a, 72a, 73a, and 74a, an actual servo rate supplied by the second servo follow up signal generator 118, amplifier demodulator 128, an input connection 131. It will be understood that the servo monitor 50 FIGURE 4 operates relay 103 FIGURE 5 and the servo monitor 150 operates the monitor relay 105 FIGURE 5.

FIGURE 4 thus provides redundancy of the servo amplifier and redundancy of the servo monitors. Thus if there is a failure in either amplifier 12 or amplifier 142 the servomotor 120 will remain effective to operate the rudder control surface of the craft. Similarly if there be a failure in servo amplifier 142 or servo monitor 150 the servo 120 will remain effective.

Figure 5:
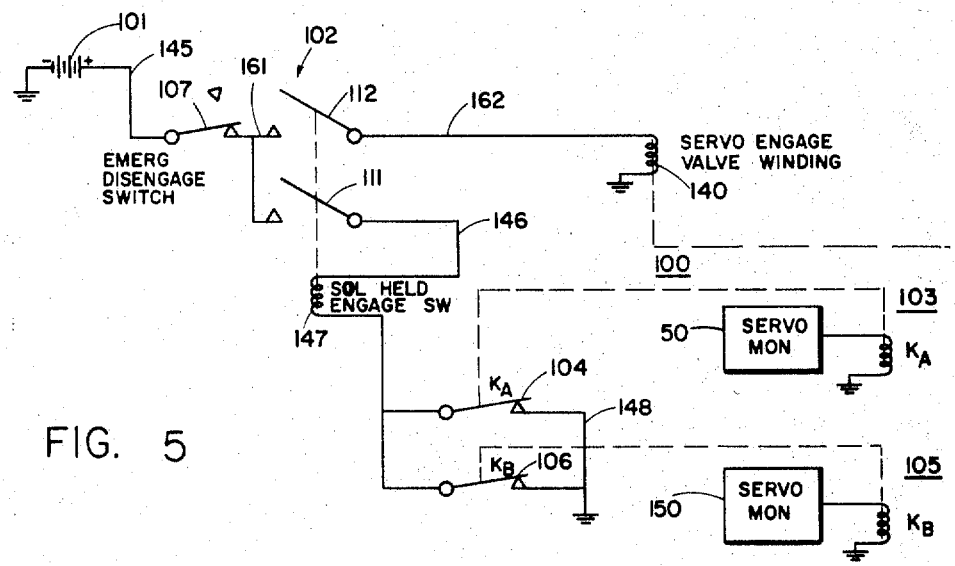
FIGURE 5 is an electrical schematic of a system application of the invention to an automatic pilot.
Figure 5:
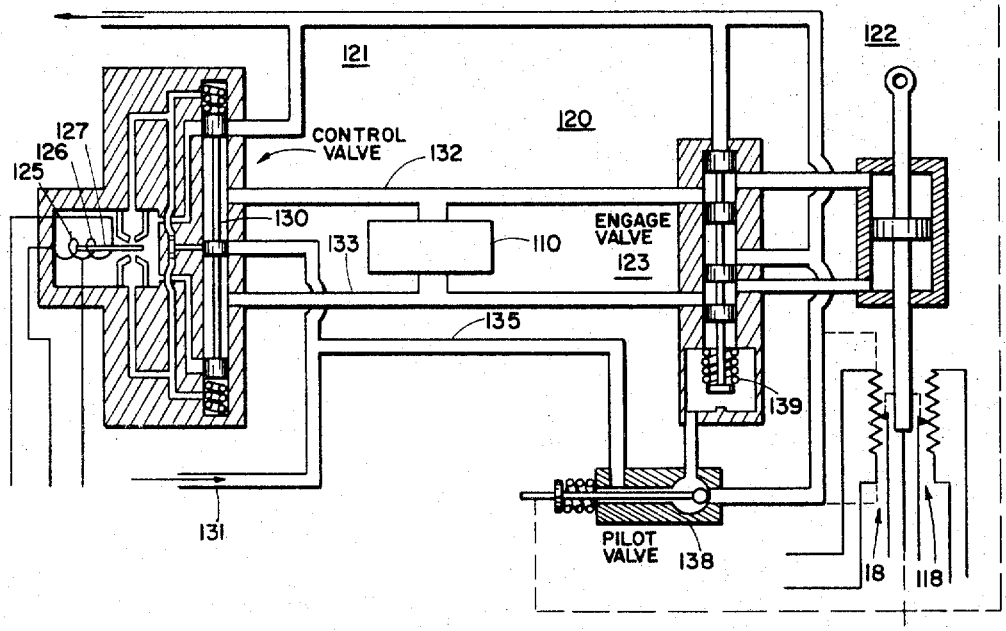

In FIGURE 5 there is shown a simplified arrangement similar generally to that in the Perkins Patent 2,960,284 FIGURES 1A and 4 illustrating an engage circuit and its associated hydraulic type servomotor. A servo engage control circuit in FIGURE 5 herein comprises a 28 volt DC source represented by a battery 101, a manually operable, biased normally open, momentarily closed, double switch arm engage switch 102, a first servo monitor operated relay 103 having an operable arm 104 normally in circuit closed position, a second operable relay 105 having a normally closed relay contact arm 106, a normally biased closed, momentarily opened manually, operable disconnect switch 107.

The hydraulic servomotor 120 comprises a control valve such as 121, a power output section 122, and an engage valve section 123. The trim motor 457 and its switches 431 in Perkins has been broadly shown in block form 110 here for simplification. The control valve section 121 includes torquer windings 125, 126 differentially energized by current from a servo amplifier such as amplifier 10 FIGURE 3 in accordance with the polarity of the electrical input signal to the amplifier. The torquer windings operate a flapper 127 relative to two adjacent ports as well known and illustrated in Patent 2,960,284 to relatively position a control valve 130 in the direction of its length to port pressure fluid over conduit 131 through valve 130 to either of conduits 132, 133. The further transmission of the fluid in conduits 132, 133 to ram section or power piston section 122 is controlled by the position of engage valve 123. Valve 123 is spring biased to fluid blocking position but is shown in fluid passing position in the figure on operation of pilot valve 138. Valve 123 moves to the position shown, on movement of valve 138 rightward, by a pressure fluid in subconduit 135 operating against the opposition of engage valve return spring 139. The pilot valve 138 is solenoid operated rightward by a solenoid having a winding 140 energized by conductor 162. The ram operates two similar follow up potentiometers 18, 118 in accordance with ram displacement for a purpose to be described.

The similarity of the servo engage control circuit and servomotor of FIGURE 5 herein with the control circuit of FIGURE 1A and the servomotor of FIGURE 4 of the Perkins Patent 2,960,284 is apparent. The basic distinction is the provision of the two servo monitor relays 103, 105 in the servo disconnect circuit and controlling the continuity thereof.

The operation of the arrangement in FIGURE 5 is thuswise: upon manually momentarily closing the engage switch 102, current passes from battery 101, conductor 145, switch 107, one arm 111 of switch 102, conductor 146, switch holding solenoid 147 of the engage relay 102, parallel monitor relay arms 104, 106, conductor 148 to ground and return to battery ground.

Upon manual operation of the engage switch arms 111, 112 a holding circuit through winding 147 is completed for the engage switch.

Also by operation of relay arm 112 with arm 111 an autopilot engage circuit for rendering the ram section 122 effective is simultaneously completed through energized conductor 145, relay contact 161, relay arm 112, conductor 162, through operating winding 140 of the pilot valve 138 and return to battery ground.

The invention herein is primarily concerned with the disconnect circuit for rendering ineffective the servomotor section 122 which circuit comprises the holding circuit for the switch 102.

In FIGURE 5 there has been provided a first redundant servo monitor 50 which operates a relay 103, and a second monitor 150 operating the other relay 105. Each servo monitor thus has a winding similar to relay winding 107 FIGURE 6B and corresponding to the arrangement of FIGURES 6A and 6B to be described with each redundant, servo monitor receiving two sets of inputs. One input is a servo direction rate command signal input from two amplifiers and another input is a servo direction rate operation signal from the servo operated follow up signal transmission conductor 31 for example.

Concerning the monitoring feature of the two rate outputs to each of two monitors, as arranged FIGURE 5 shows that if the commanded servo rate is of opposite sign to the actual servo rate, both switch arms 104, 106 will be moved to circuit opening position, i.e., if the actual servo rate and commanded rate are of opposite sign there will be a resultant signal on the switching amplifiers of the monitors 50, 150 which is of sufficient magnitude to overcome the dead spot (which is substantially provided by Zener diode 92) resulting in energization of the relay 103 or 105 associated with the amplifier to open its portion of the disconnect circuit. It is evident that by the provision of a redundant servo monitor that both monitors must indicate a servo operation malfunction or failure before the servomotor is rendered ineffective or disengaged from its respective control surface.

While FIGURE 5 shows the monitoring arrangement for the two monitor relays 103, 105 wherein they both are to be moved to open position to jointly disconnect the servomotor it is to be understood that an alternative arrangement may be provided wherein if the relay contact 104 or 106 is normally open and closing thereof renders the disconnect circuit effective to operatively disengage the servomotor from the control surface that in such instance the relay contacts 104, 106 would be in an electrical series relation rather than a parallel relation as in FIGURE 5.

While the arrangement shown in FIGURE 3 has been described in detail in connection with an electrical schematic thereof in FIGURES 6A, 6B it will be readily appreciated that the arrangement in FIGURES 1 and 2 also may be embodied in an electrical arrangement.

FIGURES 6A and 6B herein together show the rate direction servo monitor used with two amplifiers and two feedbacks when two sets of inputs each set corresponding to the combined outputs of an amplifier as by amplifier 10 and operation of the servo as by demodulator 20 are supplied to a summer and lag circuit arrangement 55. Arrangement 55 comprises an input section 60, and a feedback arrangement 68.

The amplifier 64 connected to input section 60 for control thereby has outputs of one phase or another, or one polarity or another, depending on the inputs on resistor conductors 71, 72, 73, 74. Thus resistor conductors 71, 73 form one pair of the inputs to amplifier 64 of the monitor and are connected across the two torquer windings of a fluid operated servomotor control valve, and conductors 72, 74 constitute a second pair of input resistor conductors for the monitor and are connected across the pair of windings of the torquer. The conductors 71, 73 thus are energized by the output from the first amplifier and conductors 72, 74 are energized from the redundant or second amplifier.

In other words resistors 71, 72 are electrically in parallel with a first winding of the valve torque motor and resistors 73, 74 are electrically in parallel with the second winding of the valve torque motor as evident further from FIGURE 4 to be described.

The electrical signals to the input control section 60 pass through to the magnetic amplifier 64 which has its output supplied over conductor 75 through lag network 68 comprising resistor 78, resistor 79, and capacitor 80 to conductor 81. The electrical signal on conductor 81 is applied in one instance through a highpass feedback arrangement, comprising conductor 82 and capacitor 83, to the input side of the magnetic amplifier 64 to compensate for the lag of the servo thereby making the path to trinary 53 electrically similar to that to trinary 54. The output from the summer lag circuit on conductor 81 is transmitted to conductor 84, FIGURE 6A, and is supplied thereover to the limiter 52, FIGURE 6B.

The output from the electrical signal limiter 52 is supplied to the trinary network 53 which is represented as an electronic trinary having three stable states. This term trinary indicates the device is capable of three outputs namely zero output, output of one polarity or output of another polarity any one of which appears on conductor 90. The output from trinary 53 is applied over conductor 90 to lag network 91 and thence to a signal combining arrangement 100. The signal combining arrangement 100 constitutes a portion of switching amplifier 30. Amplifier 30 includes transistor amplifier 94 to which the output of arrangement 100 is supplied through Zener diode 92 substantially providing the dead spot of the amplifier.

A second input electrical signal indicative of extent of servo displacement for the arrangement of FIGURE 6B is supplied over conductor 31 through the resistor capacitor lead network 56 to provide the equivalent of servo operation rate to the second trinary device 57 which is similar to electronic trinary device 53. The output of trinary device 57 is supplied over conductor 96 and lag network 93 to the signal combining arrangement 100 which obtains the difference of like polarity signals on conductors 90, 96 and the sum of the absolute quantities if their signs are opposite. As previously stated, the electrical polarities on conductors 90, 96 are such that the outputs of the trinary networks 53, 57 have the same sign when the servo direction rate and commanded servo rate have the same sign and indicate servo operation consistent with that commanded by the servo amplifier.

By subtracting the two trinary outputs in the combining arrangement 100 within switching amplifier 30, which has a dead spot of slightly less than twice the output of the single trinary, the amplifier is switched when the rate signals from the two trinarys are of opposite signs indicating inconsistent servo direction rate relative to commanded direction rate. By switching is meant that the switching amplifier 30 has an output sufficient to overcome its dead spot and energizes relay winding 107 to open the circuit of relay 103, 105, opening the circuit through relay arms 104, 106 rendering the servomotor ineffective on the control surface as will be hereinafter described in detail.

*Operation*

Normally the amplifiers 12 and 142, since they receive similar control signals, will have the same outputs and also the two follow-up signal generators 18 and 118 will have same outputs. The servo response should be in accordance with the commanded response. However if the commanded response differs from the actual response in that the two are inconsistent, both servo monitors 50, 150 will operate their relays 103, 105 with the ultimate effect being to open the circuit of winding 140 so that the pilot valve will move to the left from the position shown in FIGURE 5. This cuts off the pressure from conduit 135 and enables the spring 139 to expand thereby cutting off supply conduits 132, 133 to the opposed ends of the servo section 122 and connecting its ram with the return line. In this manner the servomotor power section is rendered ineffective to operate the rudder control surface.

By the above described arrangements, a redundant, servo monitor renders the servomotor ineffective to position the related control surface of an aircraft when there arises a difference between a command to the servomotor and the actual response of the servomotor to the command. Further, redundant provisions extend to the inclusion of duplicate amplifiers having outputs that apply the command signals to the servo monitors and also to the servomotor to better secure the continual operability of the servomotor during the mission of the aircraft. Additionally, the provisions of the redundant monitor precludes loss of monitoring of the servo direction rate.

What is claimed is:

1. Monitoring apparatus for a servo motor operating craft attitude control means, comprising:

first signal providing means responsive to the command operation direction rate to the servo motor;

second signal providing means responsive to the servo motor actual operation direction rate, the two signals normally being consistent; and further means controlled by the signals from the first and second means, and having a threshold of operation only slightly less than twice the possible largest magnitude of either signal thereby rendering said servo motor ineffective on said attitude control means only when the said signals from the first and second means are inconsistent and their sum exceeds the threshold or a predetermined magnitude, indicating a function of servo direction operation malfunction as when the servo direction is reverse from that commanded.

2. In a reversible closed loop motor control system having a servo motor operating condition changing means and controlled by a signal amplifier in turn controlled by a resultant signal from a plurality of signal sources, rotation direction monitoring means comprising:

first means responsive to the output of the amplifier to provide a first limited magnitude signal of a sign in accordance with the commanded servo direction and rate;

second means responsive to the operation of the servo motor providing a second limited magnitude signal normally of consistent sign with the first signal and in accordance with the actual servo operation direction and rate; and means having a non-linear threshold or dead spot combining the first and second signals so that their resultant is greater, when the signals have unlike signs, or less, when the signals have like signs, as an absolute quantity than the larger of said first or second signals and responsive to the resultant signal and rendering the servo motor ineffective on the condition changing means only when the resultant of the signals is larger as an absolute quantity than the largest signal, indicating a dissimilarity between the commanded and actual servo direction and rates as when the servo direction is reverse from that commanded.

3. The apparatus of claim 2 wherein said combining means includes two trinary or on-off devices normally in off position, and the two trinaries jointly supply inputs to the combining means, one trinary responding to the first signal, the other trinary responding to the second signal.

4. The apparatus of claim 2 wherein the combining means includes a lag device or lag network to maintain proper phasing of the two signals from the first and second means, as when the servo rate changes sign.

5. The apparatus of claim 2, wherein said combining means includes two devices each providing an output of three levels; namely, positive, zero, or negative and correspondingly an output of one phase or polarity, zero output, or a second output of opposite phase or opposite polarity whereby each device is an on-off-on operable device and each device is normally in the off position, and the two devices jointly supply inputs to the combining means, one device responsive to the first signal, the other device responsive to the second signal, each device when operating supplying a significant step output.

6. In a closed loop, position feedback servo motor control system, a fail safe arrangement controlling a circuit for rendering the servo motor ineffective to operate a control surface of an aircraft, comprising:

a first source of signal having a sign or sense representative of a desired direction and rate of operation of the servo motor;

a second source of signal operated by the servo motor having a sign or sense normally consistent with the first signal indicating the actual direction and rate of operation of the servo motor; and means requiring a predetermined magnitude signal to initiate its operation connected to the first and second sources and controlled jointly by said two signals and effective only when they are of opposite sign or inconsistent as when the servo direction is reverse from that commanded thereby providing a resultant signal greater than either of said two signals from the first and second sources, operating said control circuit to terminate further servo motor operation.

7. The apparatus of claim 6, wherein said last named means comprise a first multistable device controlled by the signal of the first source, a second multistable device controlled by the signal of the second source, and a switching means operative jointly by said multistable devices when the signals from the two sources are inconsistent thereby overcoming the operation threshold of said switching means.

8. The apparatus of claim 6, wherein a lag device is arranged between the two multistable devices and said switching means to prevent the switching means input from one source causing the multistable device to change to its other stable state before the input from the other source causes its multistable device to change to its other stable state, when a signal source changes sign.

9. The apparatus of claim 1 wherein said further means comprises shaping or phasing means for said first and second signals for developing two similar signals, and switching means receiving said signals and operative when said signals are inconsistent.

10. The apparatus of claim 2, wherein said first and second means each comprise a multistable device having a large fixed output of one polarity or another in accordance with small signals applied thereto.

11. The apparatus of claim 1, wherein the further means is responsive to the servo motor direction and operation rate.

12. The apparatus of claim 1, wherein said signals are electrical and said further means comprises gain and shaping networks effective on the signals from said first and second electrical signal providing means to provide two similar signals and switching means controlled by said signals for rendering the servo motor ineffective.

13. The apparatus of claim 12, wherein said further means includes a separate trinary device operated by each similar signal and said trinary devices control said switching means.

References Cited

UNITED STATES PATENTS

| | | |
|---|---|---|
| 2,823,877 | 2/1958 | Hess. |
| 2,973,927 | 3/1961 | Miller et al. |
| 2,995,694 | 8/1961 | Sorkin et al. |
| 3,108,214 | 10/1963 | Wilkerson _____ 318—144 |
| 3,166,700 | 1/1965 | Zarleng _____ 318—144 |

ORIS L. RADER, *Primary Examiner.*

THOMAS E. LYNCH, *Assistant Examiner.*

U.S. Cl. X.R.

318—448, 489; 244—77